United States Patent [19]

Policastro et al.

[11] Patent Number: 4,668,754

[45] Date of Patent: May 26, 1987

[54] SILICONE-POLYAMIDE BLOCK POLYMERS, LACTAM TERMINATED ORGANOSILOXANE AND METHOD FOR MAKING

[75] Inventors: Peter P. Policastro, Schenectady; Jonathan D. Rich, Ballston Lake, both of N.Y.

[73] Assignee: General Electric Company, Schenectady, N.Y.

[21] Appl. No.: 757,120

[22] Filed: Jul. 22, 1985

[51] Int. Cl.$^4$ ................................................ C08G 77/42
[52] U.S. Cl. ...................................... 528/26; 525/431; 525/474; 528/14; 528/27; 528/33
[58] Field of Search ................................ 528/27, 28, 26; 525/431, 474

[56] References Cited

U.S. PATENT DOCUMENTS 3,723,566  3/1973  Thompson et al. ................ 528/26

OTHER PUBLICATIONS

U.S. patent application Ser. No. 645,638, Policastro and Hallgren, filed Aug. 30, 1984—Silyl Polyamides and Method for Their Preparation.

*Primary Examiner*—Wilbert J. Briggs, Sr.
*Attorney, Agent, or Firm*—William A. Teoli; James C. Davis, Jr.; James Magee, Jr.

[57] ABSTRACT

Silicone-polyamide block polymers are provided which result from the reaction of lactam and silicone having chemically combined arylacyl or arylisocyanato groups. Silicone having terminal aryllactam groups useful for making silicon-polyamide also are provided.

7 Claims, No Drawings

SILICONE-POLYAMIDE BLOCK POLYMERS, LACTAM TERMINATED ORGANOSILOXANE AND METHOD FOR MAKING

CROSS REFERENCE TO RELATED APPLICATIONS

Reference is made to the copending application of Jonathan Rich, Ser. No. 740,687, filed June 3, 1985, for Method for Making Siliconarylacylazides, Siliconarylisocyanates and Products Obtained Therefrom and copending application of Policastro et al., Ser. No. 645,638, filed Aug. 30, 1984, abandoned, for Silyl Polyamides and Method for Their Preparation, which applications are assigned to the same assignee as the present invention and incorporated herein by reference.

BACKGROUND OF THE INVENTION

Prior to the present invention, as shown by Thompson et al. U.S. Pat. No. 3,723,566, organosiloxane polyamide block polymers were made by effecting reaction between lactam and organosiloxane having at least one substituent containing an N-acyl lactam group or a functional group effective in initiating the polymerization of lactam.

In copending application of Policastro et al., Ser. No. 706,374, filed Feb. 27, 1985, U.S. Pat. No. 4,603,177, for Silicone-Lactam Blends and Products Obtained Therefrom, a method is described for making cross-linked polyamide by using certain lactam promoters having silicon attached to the lactam nitrogen by silicon-nitrogen linkages. Although the silicone-polyamides or silicon containing crosslinked polyamides have been found to provide a variety of useful products, these materials are inherently subject to oxidative instability as a result of the presence of silicon alkylene linkages between organosilicon blocks and polyamide blocks.

The present invention is based on the discovery that silicone-polyamide block polymers having interconnecting silicon arylene linkages can be made by effecting reaction between lactam and organosilicon material having chemically combined groups of the formula

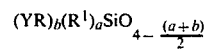

where R is a divalent $C_{(6-14)}$ arylene hydrocarbon radical or substituted $C_{(6-14)}$ divalent arylene hydrocarbon radical. The resulting silicone-polyamide block polymers can be used as molding compounds, encapsulants, tough rubbers, coatings, adhesives and thermoplastic property modifiers.

STATEMENT OF THE INVENTION

There is provided by the present invention, silicone-polyamide block polymers comprising chemically combined silicone blocks and poly(alkylene amide) blocks which are joined together by divalent groups of formula (1).

There is also provided by the present invention, a method for making silicone-polyamide block polymers which comprises, effecting reaction between lactam and silicone having the formula

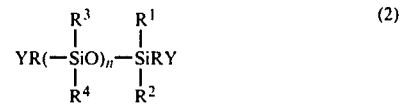

in the presence of an effective amount of a condensation catalyst, where R is as previously defined, Y is a member selected from acyl and isocyanato, $R^1$, $R^2$, $R^3$ and $R^4$ are the same or different and are members selected from $C_{(1-18)}$ monovalent hydrocarbon radicals and substituted $C_{(1-18)}$ monovalent hydrocarbon radicals and n is an integer equal to 1 to 2000 inclusive. Although silicones of formula (2) are preferred, the use of silicones having up to about 10 mole percent, based on the total moles of chemically combined siloxy units in the silicone, of polysiloxy units having the formula

is also contemplated, where a is 0 or 1, b is 1 or 2 and the sum of a+b is 1 or 2 and R, $R^1$ and Y are as previously defined.

Radicals included by R of formula (1) are, for example, phenylene, tolylene, xylylene, napthalene, anthrylene; substituted divalent arylene radicals such as chlorophenylene, and nitrotolylene. Radicals included by $R^1$, $R^2$, $R^3$ and $R^4$ are, for example, alkyl radicals such as methyl, ethyl, propyl, butyl, pentyl; substituted alkyl radicals such as trifluoropropyl, cyanoethyl; aryl radicals such as phenyl, tolyl, xylyl, naphthyl; haloaryl radicals such as bromophenyl.

Lactam which can be utilized in the practice of the present invention is included by the formula

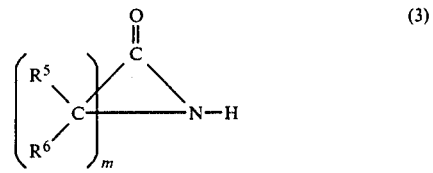

where $R^5$ and $R^6$ are members selected from the class consisting of hydrogen, $C_{(1-8)}$ alkyl, substituted $C_{(1-8)}$ alkyl, $C_{(6-13)}$ aryl, substituted $C_{(6-13)}$ aryl and mixtures thereof, and m is an integer equal to 1–13 inclusive.

Some of the lactams included by formula (3) are, for example,

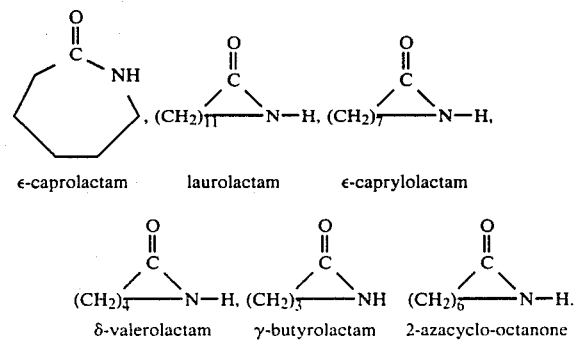

Silicone which can be used in the practice of the present invention include polydiorganosiloxane having the formula

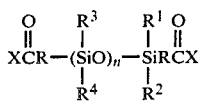 (4)

where R-R⁴ and n are as previously defined and X is halogen.

Aromatic haloacyl-terminated polydiorganosiloxane of formula (4) can be made by effecting reaction between a silanol terminated polydiorganosiloxane having a value of n shown by formula (2), with a halosilylaroylhalide of the formula

where R-R² and X are as previously defined.

Organo silicon materials having chemically combined groups of formula (1) and a method for making such materials are shown in copending application Ser. No. 718,039, filed Mar. 29, 1985. For Example, an aromatic polyacylhalide, such as terephthaloyl chloride, is reacted with substantially an equivalent amount of a halopolysilane, such as 1,2-dichlorotetramethyldisilane, in the presence of a transition metal catalyst. There is obtained a p-halodiorganosilylbenzoyl halide as the exclusive silylaryl reaction product. Reaction of such p-halodiorganosilylaroylhalide can be used to make the corresponding disiloxane or polydiorganosiloxane having chemically combined units of formula (1).

In addition to the above-described organo silicon material having terminal haloacylaryl groups, there also can be used aryl isocyanato terminated polydiorganosiloxane of the formula

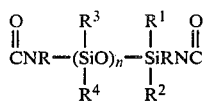 (5)

where R-R⁴, and n are as previously defined, which can have a viscosity in the range of from 500 centipoises to 40,000 centipoises.

The synthesis of arylisocyanato terminated polydiorganosiloxane is described in copending application Ser. No. 740,687, utilizing polydiorganosiloxane of formula (4) and an alkali metal azide to produce the corresponding organosilicon material having at least one chemically combined arylacylazide group which is thereafter thermally decomposed.

Condensation or base catalyst which can be used in the practice of the present invention are, for example, alkali metals such as lithium, potassium, sodium, cesium, rubidium and the corresponding hydrides, hydroxides, carbonates, fluorides, $C_{(1-8)}$ alkoxides and amides such as sodium hydride, lithium hydride, sodium hydroxide, potassium carbonate, cesium fluoride, sodium amide, sodium methoxide; organo alkali compounds, for example, methyl, butyl and phenyl lithium.

In a further aspect of the present invention, the silicone-polyamide block polymers can be made by effecting reaction between lactam terminated organosiloxane having the formula

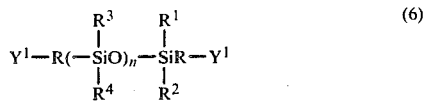 (6)

and lactam and previously defined in the presence of a base catalyst, where R, $R^1$, $R^2$, $R^3$, $R^4$ and n are as previously defined and $Y^1$ is a member selected from

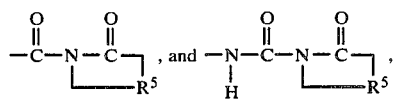

$R^5$ is a divalent alkylene radical having a value of 1–13.

The lactam terminated organosiloxane of formula (6) can be made by effecting reaction between aromatic haloacyl silicone of formula (4) with lactam of formula (3) in the presence of base, such as triethylamine in an inert organic solvent such as dichloromethane. The hydrohalide salt is removed by washing the solution and evaporating the organic solvent.

In the practice of the invention the siliconepolyamide block polymers can be made by effecting reaction between the acyl or isocyanato terminated silicone of formula (2) or the lactam terminated silicone of formula (6) in the presence of an effective amount of a base catalyst. In forming the silicone-polyamide block polymer a temperature in the range of from 70° C. to 250° C. can be employed.

A dry blending procedure involving milling the lactam and the silicone along with the base catalyst and optionally with filler on a mill or Henchel mixer can be employed. Polymerization is then achieved by heating the mixture above its melting point. Another procedure which can be used to blend the various ingredients is by converting the lactam or silicone or both to the liquid state to facilitate the intermixing of the various ingredients of the blend, such as the lactam, silicone, base catalyst and the filler. Addition of the catalyst can result in rapid polymerization. A third procedure which can be used to make the silicone lactam blend is by forming the blend of silicone and lactam in situ by heating the lactam in the presence of base catalyst and the silicone as previously described.

The resulting material can be employed as a two component adhesive, when, for example, the base catalyst and lactam are mixed to form component A and the silicone and filler are mixed to form component B. Component A is heated to the liquid state and combined with component B on a suitable substrate to form an adhesive joint.

Experience has shown that optimum results also can be obtained if the silicone having terminal lactam functional groups of formula (6) is used in combination with lactam to make the silicone-polyamide block polymers of the present invention. This procedure allows advantages over the use of silicone terminated with arylacylhalide radicals since the generation of metallic salts such as sodium chloride can be avoided.

Reinforcing filler also can be blended with the silicone-polyamide block polymers to reinforce the resulting compositions. There can be utilized finely divided inert fillers, including titanium dioxide, zirconium silicate, silica aerogel, iron oxide, diatomaceous earth, fumed silica, carbon black, precipitated silica, glass fibers, polyvinylchloride, ground quartz and calcium carbonate. The amounts of filler used can obviously be varied within wide limits in accordance with the intended use. For example, there can be used up to 100 parts of filler, per 100 parts of the heat curable silicon-containing lactam blends.

In order that those skilled in the art will be better able to practice the invention, the following examples are given by way of illustration and not by way of limitation. All parts are by weight.

EXAMPLE 1

There was added slowly 68 microliters ($3.76 \times 10^{-3}$ moles) of water to a solution of 2 grams of p-chlorodimethylsilylbenzoyl chloride and 30 ml. of dry tetrahydrofuran. The resulting mixture was stirred at room temperature for 45 minutes resulting in the evolution of gaseous HCl. The solvent was removed in vacuo resulting in the production of a colorless oil which was dissolved in pentane and filtered. There was obtained an 88% yield of 1,3-bis-(p-benzoylchloride)tetramethyldisiloxane as colorless crystals (M.P. 50°–51° C.).

There was slowly added dropwise at room temperature to 40 grams of the above p-cholorodimethylsilylbenzoyl chloride, a 150 ml. dry toluene solution containing 45 grams of a silanol terminated polydimethylsiloxane having an average of 165 chemically combined dimethylsiloxy units. Removal of HCl was facilitated by maintaining a constant vacuum. After the addition was completed, stirring of the mixture was continued for an additional 2 hours to insure complete reaction. The resulting product was then stripped of unreacted p-chlorodimethylsilylbenzoyl chloride by heating the mixture at 120° C. at 0.1 torr. A quantitative yield of the resulting endcapped polydimethylsiloxane was obtained. Based on method of preparation and NMR spectra, there was obtained a polydimethylsiloxane having terminal dimethylsilylbenzoyl chloride groups.

There was then added 6.1 grams (0.5 millimoles) of the above p-benzoylchloro terminated polydimethylsiloxane to 10 grams of ε-caprolactam which had been reacted at 130° C. with 275 milligrams of a 60% mineral oil dispersion of sodium hydride. Within several minutes there was obtained a solid silicone-polyamide copolymer. The resulting material was a tough elastomeric silicon-polyamide which was useful as a silicone elastomeric adhesive.

EXAMPLE 2

There was dissolved 3.0 grams (0.0073 mole) of bis-4,4-benzoylchlorotetramethyldisiloxane in 50 ml. dichloromethane. The solution was cooled to 0° C. and 1.6 gram (0.016 mole) triethylamine and 1.8 gram (0.015 mole) ε-caprolactam was added. The solution was allowed to warm to room temperature and was stirred overnight. The solution was washed with water, dried over sodium sulfate and concentrated to give 3.8 grams, (92% yield) of bis-4,4'-(benzoylcaprolactam)tetramethyldisiloxane. The product was recrystallized from ethylether/dichloromethane to give colorless crystals (m.p. of 101°–3° C.).

EXAMPLE 3

There was dissolved 10.0 grams (0.0053 mole) of a phenylchloroacyl terminated polydimethylsiloxane having an average of about 20 dimethylsiloxy units in 50 ml. dichloromethane at 0° C. containing 1.3 gram (0.11 mole) ε-caprolactam and 1.2 gram (0.12 mole) triethylamine. The reaction was stirred overnight under ambient conditions. The reaction mixture was then washed with water, dried over sodium sulfate, filtered and concentrated to give a viscous fluid. Based on method of preparation and its $^1$H NMR and IR spectra, the resulting fluid was a polydimethylsiloxane having terminal phenylacyllactam groups.

There were reacted at 130° C., 10.0 grams (0.088 mole) caprolactam and 0.2 gram (0.009 mole) sodium hydride until hydrogen evolution ceased. There was added to the resulting mixture with stirring, 6.1 grams (0.003 mole) of the above acyllactam terminated fluid. The resulting homogeneous mixture was poured onto an aluminum plate and covered with a second aluminum plate to form an adhesive joint. The adhesive joint was heated 3 minutes in an oven at 130° C. Upon cooling, there was obtained a composite part which could not be easily broken apart.

EXAMPLE 4

There was added dropwise a 10 microliter solution of 0.18 gram of sodium azide to a solution of 5 grams of the benzoyl chloride terminated polydimethylsiloxane of Example 1 in 75 ml. of dry acetone. The resulting mixture was stirred at room temperature for 1 hour. The mixture was then poured into 250 ml. of water, extracted with three 50 ml. portions of ether and the combined organic portions were washed with three 100 ml. portions of water. The organic layer was separated, dried over anhydrous magnesium sulfate, was heated in a rotary evaporator to remove the ether solvent. There was obtained a clear silicone oil whose infrared spectrum showed the presence of acylazide stretching frequencies in the absence of carbonyl bands. The resulting oil was dissolved in 70 ml. of dry toluene and placed over activated 3A molecular sieves for 18 hours. The solution was then decanted and heated to reflux temperatures for 1 hour. The mixture was then allowed to cool and the solvent was removed in vacuo providing 4.6 grams (90% yield) of a clear silicone oil. Based on method of preparation and IR spectra, the resulting product was a polydimethylsiloxane having an average of 165 chemically combined dimethylsiloxy units and terminated with 3-phenylisocyanato dimethylsiloxy units.

There was added 6.1 grams of the p-phenylisocyanate terminated polydimethylsiloxane to 10 grams of a base dispersion of caprolactam which had been reacted at 130° C. with 2.75 milligrams (6.9 millimole) of a 60% sodium hydride dispersion. Within several minutes, the mixture cured to a solid silicone-polyamide copolymer. The resulting material was found to be a tough elastomeric material which exhibited useful properties as a silicone elastomeric adhesive.

EXAMPLE 5

There was added 68 microliters of water ($3.76 \times 10^{-3}$ moles) to a solution containing 2 grams of p-chlorodimethylsilylbenzoyl chloride (87.5% pure, with a terephthaloyl chloride remainder) dissolved in 30 ml. of dry tetrahydrofuran. The resulting mixture was stirred at room temperature for 45 minutes resulting in the evolution of gaseous HCl. The solvent was then removed in vacuo leaving a colorless oil which was dissolved in pentane and filtered. Based on method of preparation, there was obtained an 88% yield of 1,3- bis(p-benzoylchloride)tetramethyldisiloxane (M.P. 50°–51° C.).

In accordance with the procedure of Example 4, there was added dropwise 0.65 grams (10 millimole) of sodium azide dissolved in 10 ml of water to a solution of 2 grams of the above 1,3-bis(p-benzoylchloro)tetramethyldisiloxane. The mixture was stirred for 1 hour and the solution was then poured into 150 ml. of water and extracted three times with 50 ml. portions of ether. After drying with magnesium sulfate and removal of ether solvent, there was obtained 2.85 grams (91% isolated yield) of a pale-yellow oil. Based on method of preparation and infrared data, the resulting product was 1,3-bis(p-phenylacylazido)tetramethyldisiloxane.

The corresponding isocyanate was obtained by heating the azide terminated tetramethyldisiloxane in dry toluene over activated 3A molecular sieves in accordance with the procedure of Example 4. There was obtained after one hour of refluxing, an 83% isolated yield of the desired diisocyanate as a pale-yellow oil. The identity of the 1,3-bis(p-phenylisocyanato)tetramethyldisiloxane was further confirmed by its IR spectra and Mass Spec. analysis.

There was added 440 milligrams of the above 1,3-bis(p-phenylisocyanato)tetramethyldisiloxane to 10 grams of ε-caprolactam which had been reacted with 275 milligrams of 60% sodium hydride at 130° C. There was obtained a tough translucent material similar to commercial Nylon 6 in its properties.

Although the above examples are directed to only a few of the very many variables which can be utilized in the practice of the present invention, it should be understood that the present invention is directed to a much broader variety of silicon-polyamide block polymers and method of making as shown in the description preceding these examples.

What we claim as new and desire to secure by Letters Patent of the United States is:

1. A method for making silicone-polyamide block polymers which comprises, effecting reaction between lactam and silicone having the formula

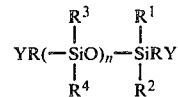

in the presence of an effective amount of a basic catalyst, where R is a divalent $C_{(6-14)}$ arylene hydrocarbon radical or substituted $C_{(6-14)}$ divalent arylene hydrocarbon radical, Y is a member selected from acyl and isocyanato, $R^1$, $R^2$, $R^3$ and $R^4$ are the same or different and are members selected from $C_{(1-18)}$ monovalent hydrocarbon radicals and substituted $C_{(1-18)}$ monovalent hydrocarbon radicals and n is an integer equal to 1 to 2000 inclusive.

2. A method in accordance with claim 1, where the lactam is caprolactam.

3. A method in accordance with claim 1, where the lactam is γ-butyrolactam.

4. A method in accordance with claim 1, where the lactam is laurolactam.

5. A method in accordance with claim 1, where a mixture of lactams is employed.

6. A method in accordance with claim 1, where the silicone is a polydimethylsiloxane.

7. A method in accordance with claim 1, where the basic catalyst is an alkali hydride.

* * * * *